(12) United States Patent
Forutanpour et al.

(10) Patent No.: US 9,733,086 B2
(45) Date of Patent: *Aug. 15, 2017

(54) HAPTIC BASED PERSONAL NAVIGATION

(71) Applicant: QUALCOMM Incorporated, San Diego, CA (US)

(72) Inventors: Babak Forutanpour, Carlsbad, CA (US); Louis Dominic Oliveira, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,199

(22) Filed: Apr. 4, 2016

(65) Prior Publication Data

US 2016/0216115 A1 Jul. 28, 2016

Related U.S. Application Data

(63) Continuation of application No. 12/943,690, filed on Nov. 10, 2010, now Pat. No. 9,335,181.

(51) Int. Cl.
*G01C 21/00* (2006.01)
*G01C 21/20* (2006.01)
(Continued)

(52) U.S. Cl.
CPC ............. *G01C 21/00* (2013.01); *G01C 21/20* (2013.01); *G01C 21/3652* (2013.01);
(Continued)

(58) Field of Classification Search
CPC .................................................. G01C 21/3652
See application file for complete search history.

(56) References Cited

U.S. PATENT DOCUMENTS 6,320,496 B1    11/2001  Sokoler et al.
6,424,333 B1 *   7/2002  Tremblay ................ G06F 3/011
                                                              345/156
(Continued)

FOREIGN PATENT DOCUMENTS

DE       102005032528 A1    1/2007
EP           2042835 A2     4/2009
(Continued)

OTHER PUBLICATIONS

International Search Report and Written Opinion—PCT/US2011/060239—ISA/EPO—Jul. 5, 2012.
(Continued)

*Primary Examiner* — Jonathan L Sample

(57) ABSTRACT

A mobile platform includes one or more haptic feedback elements that are positioned in regions of the mobile platform that are proximate to a facial region of a user. By way of example, the haptic feedback elements may be electric force elements that overlay a display. The mobile platform is capable of determining a current location and receiving a desired location, which may be, e.g., a location provided by the user, a location with superior signal strength or of another mobile platform. The mobile platform determines directions from the present location to the current location and translates the direction in to control signals. Haptic signals are produced to the facial region of the user by the haptic feedback elements in response to the control signals, thereby providing the directions to the user.

37 Claims, 7 Drawing Sheets

(51) Int. Cl.
*G01C 21/36* (2006.01)
*G06F 1/16* (2006.01)
*G06F 3/01* (2006.01)
*H04W 4/02* (2009.01)
*G01S 19/13* (2010.01)

(52) U.S. Cl.
CPC ............ *G06F 1/1626* (2013.01); *G06F 3/016* (2013.01); *H04W 4/021* (2013.01); *H04W 4/026* (2013.01); *G01S 19/13* (2013.01)

(56) References Cited

U.S. PATENT DOCUMENTS

| | | | |
|---|---|---|---|
| 6,429,846 B2* | 8/2002 | Rosenberg | A63F 13/06 345/156 |
| 6,671,618 B2 | 12/2003 | Hoisko | |
| 7,779,166 B2* | 8/2010 | Grant | G06F 3/016 710/5 |
| 9,513,705 B2* | 12/2016 | Gray | G06F 3/016 |
| 2002/0109668 A1* | 8/2002 | Rosenberg | G05G 9/047 345/156 |
| 2002/0111737 A1* | 8/2002 | Hoisko | G01C 21/20 701/526 |
| 2003/0085873 A1* | 5/2003 | Burrell | H01H 9/0214 345/158 |
| 2004/0039579 A1 | 2/2004 | Chithambaram et al. | |
| 2005/0060088 A1 | 3/2005 | Helal et al. | |
| 2005/0283308 A1 | 12/2005 | Szabo et al. | |
| 2006/0066569 A1* | 3/2006 | Eid | G06F 3/016 345/156 |
| 2006/0136631 A1* | 6/2006 | Eid | G06F 3/016 710/72 |
| 2006/0227047 A1 | 10/2006 | Rosenberg | |
| 2006/0288137 A1* | 12/2006 | Grant | G06F 3/016 710/62 |
| 2007/0057913 A1* | 3/2007 | Eid | G06F 3/016 345/156 |
| 2007/0106457 A1* | 5/2007 | Rosenberg | G01C 17/00 701/532 |
| 2008/0089298 A1* | 4/2008 | Anschutz | H04W 8/005 370/338 |
| 2008/0120029 A1* | 5/2008 | Zelek | G01C 21/20 701/469 |
| 2008/0133648 A1* | 6/2008 | Grant | G06F 3/016 709/203 |
| 2008/0268874 A1 | 10/2008 | Pizzi | |
| 2009/0017803 A1 | 1/2009 | Brillhart et al. | |
| 2009/0021473 A1* | 1/2009 | Grant | G06F 3/016 345/156 |
| 2009/0023478 A1* | 1/2009 | Lowles | G06F 3/016 455/566 |
| 2009/0106655 A1* | 4/2009 | Grant | G06F 1/3231 715/702 |
| 2009/0271101 A1 | 10/2009 | Relyea et al. | |
| 2009/0291664 A1 | 11/2009 | Sandberg et al. | |
| 2009/0325647 A1* | 12/2009 | Cho | H04M 1/72519 455/567 |
| 2010/0026631 A1* | 2/2010 | Pletikosa | G06F 1/1626 345/169 |
| 2010/0198458 A1* | 8/2010 | Buttolo | G01C 21/3652 701/36 |
| 2011/0138277 A1* | 6/2011 | Grant | G06F 1/3231 715/702 |
| 2011/0161810 A1* | 6/2011 | Stallings | G06F 3/016 715/702 |
| 2011/0177831 A1 | 7/2011 | Huang | |
| 2012/0028577 A1* | 2/2012 | Rodriguez | H04N 21/44008 455/41.1 |
| 2012/0078999 A1* | 3/2012 | Andrew | G06F 3/014 709/203 |
| 2012/0086571 A1 | 4/2012 | Scalisi et al. | |
| 2012/0095674 A1 | 4/2012 | Lee et al. | |
| 2012/0116672 A1* | 5/2012 | Forutanpour | G01C 21/20 701/431 |
| 2012/0176525 A1* | 7/2012 | Garin | G01C 21/20 348/333.02 |
| 2013/0218456 A1* | 8/2013 | Zelek | G01C 21/3652 701/412 |
| 2014/0192247 A1* | 7/2014 | Cheong | G06F 3/011 348/333.11 |

FOREIGN PATENT DOCUMENTS

| | | |
|---|---|---|
| JP | 2008032513 A | 2/2008 |
| JP | 2008112466 A | 5/2008 |
| JP | 2009236518 A | 10/2009 |
| JP | 2009239629 A | 10/2009 |
| JP | 2010506203 A | 2/2010 |
| JP | 2010506302 A | 2/2010 |
| JP | 2011205206 A | 10/2011 |
| WO | WO-2008042745 A2 | 4/2008 |

OTHER PUBLICATIONS

Venesvirta, H., "Haptic Navigation in Mobile Context", Seminar paper, University of Tampere, Dec. 2008, 16 pages.

* cited by examiner

HAPTIC BASED PERSONAL NAVIGATION

CROSS-REFERENCE TO PENDING PROVISIONAL APPLICATION

This application is a continuation of and claims priority to U.S. application Ser. No. 12/943,690, filed Nov. 10, 2010, and entitled "Haptic Based Personal Navigation," which is assigned to the assignee hereof and which is incorporated herein by reference in its entirety.

BACKGROUND

Current cellular telephones and other such electronic items typically include a navigation system, such as a satellite positioning system or an internal navigation system. These navigation systems, however, are visually based, i.e., the current position and directions to a desired direction are provided via a display on the device. Thus, to consult the navigation system application while using such devices as a cellular telephone, users are typically required to disengage from the conversation so that the display can be viewed.

Additionally, when using a device as a cellular telephone, poor signal strength may adverse affect call quality. Accordingly, users are sometimes motivated to find a nearby area with improved signal strength. Currently, this is accomplished by trial and error, e.g., visually checking for improved signal strength status while walking to different areas, which again requires the user to temporarily disengage from the conversation.

SUMMARY

A mobile platform includes one or more haptic feedback elements that are positioned in regions of the mobile platform that are proximate to a facial region of a user. The haptic feedback elements may be, e.g., electric force elements that overlay a display and provide a tactile sensation to the user when activated. The mobile platform is capable of determining a current location, e.g., based on signals from a satellite positioning system or an internal navigation system. The mobile platform further receives a desired location, which may be, e.g., a location provided by the user, a location with superior signal strength or the current of intended future location of another mobile platform. The mobile platform determines directions from the present location to the current location, e.g., by contacting a server that provides the directions. The directions are translated into control signals for the one or more haptic feedback elements. Haptic signals are produced to the facial region of the user by the haptic feedback elements in response to the control signals, thereby providing the directions to the user.

DETAILED DESCRIPTION

Figure 1:
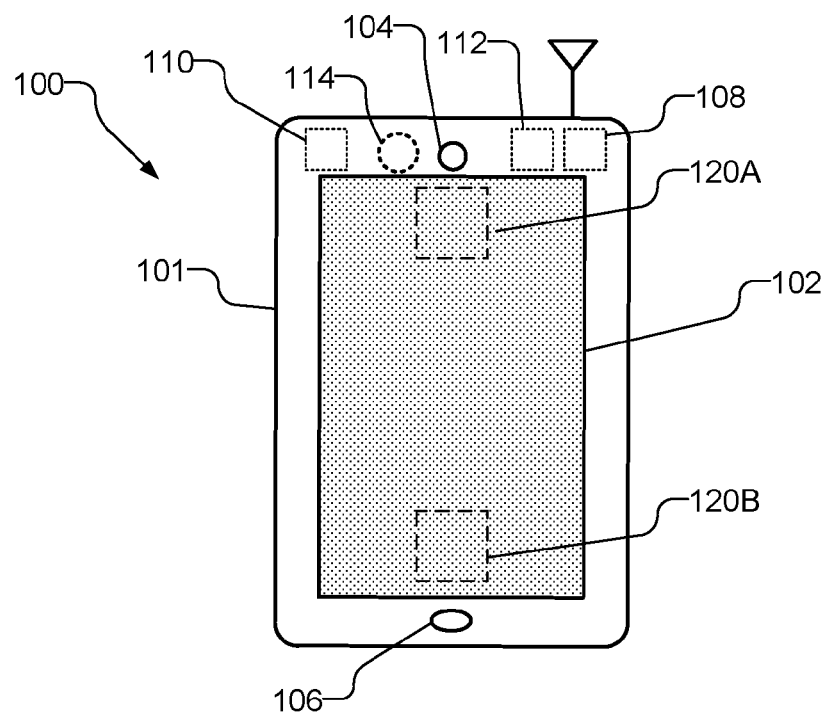
FIG. 1 illustrates a front side of a mobile platform, which may be any portable electronic device capable of providing haptic based navigation.

FIG. 1 illustrates a front side of a mobile platform 100, which may be any portable electronic device such as a cellular or other wireless communication device. As used herein, a mobile platform refers to any portable electronic device such as a cellular or other wireless communication device, personal communication system (PCS) device, personal navigation device (PND), Personal Information Manager (PIM), Personal Digital Assistant (PDA), or other suitable mobile device. The mobile platform may be capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all devices, including wireless communication devices, computers, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile platform."

The mobile platform 100 is illustrated as including a housing 101, a display 102, which may be a touch screen display, as well as a speaker 104 and microphone 106. The mobile platform 100 may include position determination and navigation components, such as a satellite positioning system (SPS) receiver 108 and orientation sensors 110, such as accelerometers, digital compass, and/or gyroscopes. The mobile platform 100 may also include a wireless transceiver 112 and a camera 114, which may be on the back side of the mobile platform 100 and is therefore shown with dotted lines. The wireless transceiver 112 and camera 114 may be used for position determination of the mobile platform 100, e.g., via wireless signal triangulation or fingerprinting, and visual localization, respectively. The mobile platform 100 further includes at least one haptic feedback element 120 that is positioned in one or more regions of the mobile platform 100 that are proximate to a facial region of a user while the user holds the mobile platform 100 to an ear, such as in regions of the display 102 or regions near of the housing 101 near the display 102. As used herein, facial region includes any area near the various anatomical regions of the face including: buccal (side of oral cavity), infraorbital (below eye), mental (chin), nasal (nose), oral (lips), orbital (eye), parotid (angle of jaw), and zygomatic (cheek bone) regions, as well as above the zygomatic arch (temple)

and the areas near and including the ear. The mobile platform 100 of FIG. 1 is illustrated with two haptic feedback elements 120A and 120B (sometimes collectively referred to as haptic feedback elements 120) in separate regions of the mobile platform 100. The haptic feedback elements 120 may be, e.g., electric force elements, one or more vibration element, or thermal elements, which produce a tactile sensation on the facial region of the user, e.g., to provide directions to a user while the user is using the mobile platform as a cellular telephone.

Figure 2:
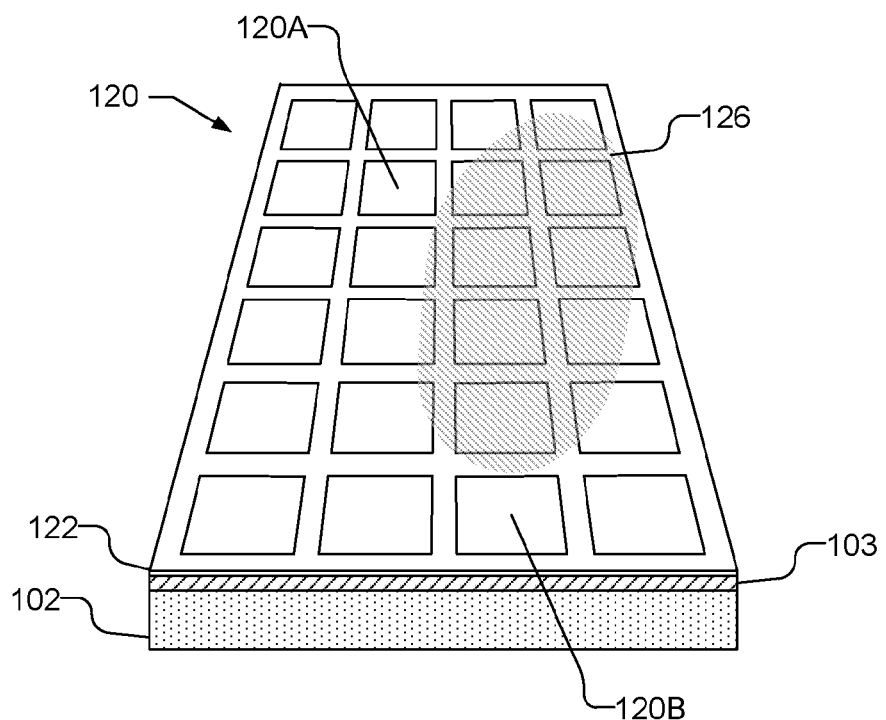
FIG. 2 illustrates a perspective view of a display with a plurality of overlying haptic feedback elements.

FIG. 2 illustrates a perspective view of the display 102 with a plurality of overlying haptic feedback elements 120, which are in the form of transparent electric force elements that are deposited over the display 102, which may be, e.g., LCD (liquid crystal display) technology, or LPD (light emitting polymer display) technology. Additionally, if desired, a touch sensor 103 may be present, which may be capacitive, resistive, infrared, and surface acoustic wave technologies, to determine one or more points of contact with the display 102. The haptic feedback elements 120 may be manufactured as electric force elements positioned in discrete areas of a transparent membrane 122 which is then deposited over the display 102. A suitable haptic feedback element 120 may be purchased from Senseg, of Finland as a product referred to as E-Sense®, or e.g., model MAX11835 or model MAX11836 from Maxim Integrated Products, Inc. of Sunnyvale, Calif. The haptic feedback elements 120 are individually controllable to produce a positive electrical charge, e.g., at 100 kHz. The positive charge on any of the electric force elements will attract nearby human skin, which is generally negatively charged. The force of the attraction between the electric force elements and nearby skin can be felt by a user thereby providing a tactile sensation. The shaded region 126 in FIG. 2 illustrates an area of contact with the user as determined by the touch sensor 103. The haptic feedback elements 120 that are located in areas of contact may be deactivated by the mobile platform 100, while nearby haptic feedback elements, e.g., 120A and 120B, are used to provide any haptic signals, as these elements are close enough to the user that the user will detect the haptic signal but not in contact with the user, which may prevent inducement of the haptic signal.

As illustrated in FIG. 2, the electric force elements 124 are arranged in a uniform 6×4 grid, however, any arrangement and additional or fewer electric force elements 124 may be used. Additionally, the electric force elements 124 are not restricted to being deposited over the display 102, and may be deposited over the housing 101 of the mobile platform 100 if desired.

Figure 3:
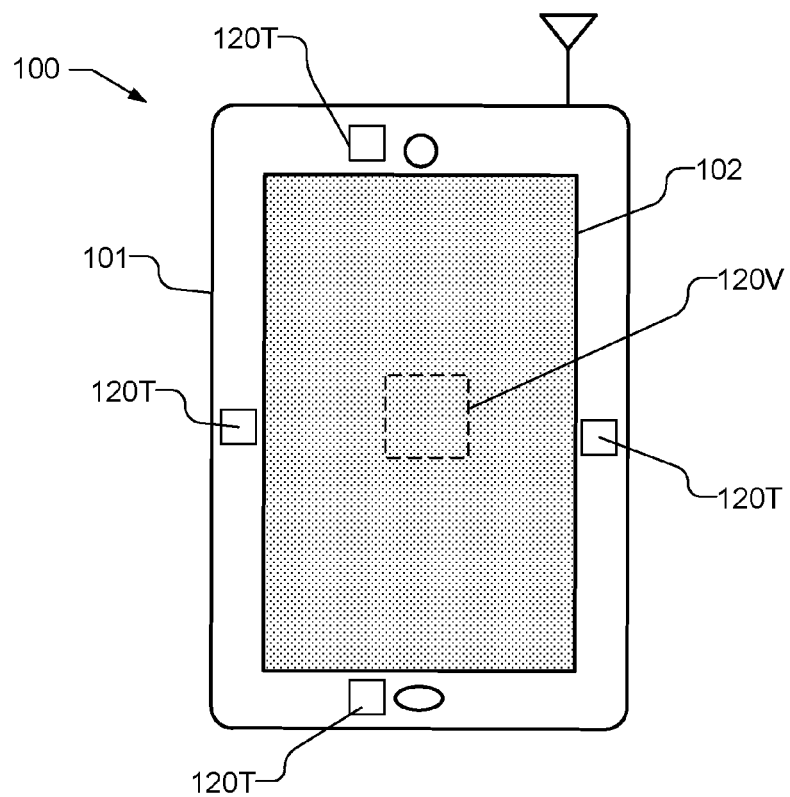
FIG. 3 illustrates a front view of the mobile platform 100 that is capable of providing haptic based navigation using vibrating or thermal elements.

FIG. 3 illustrates a front view of the mobile platform 100 that is capable of providing haptic feedback to the user through vibration or heat. For example, the mobile platform 100 may include one or more vibrators 120V located inside the mobile platform 100. The vibrators 120V may be a small motor with an off axis mass, that when activated produces vibrations. Alternatively, or additionally, the mobile platform 100 may include thermal elements 120T positioned on the housing 101 at various locations. The thermal elements 120T, when activated produce a tactile sensation to the user in the form of heat.

Additionally, the mobile platform 100 may be capable of position determination and navigation. For example, the mobile platform 100 may include an SPS receiver 108 that receives signals from a satellite positioning system (SPS). A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Moreover, the mobile platform 100 is not limited to position determination using only SPS, but may use other position determination techniques, including those implemented in conjunction with various wireless communication networks, such as cellular towers or from wireless communication access points, such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. Alternative methods of position determination may also be used, such as dead reckoning using the motion sensors 110 or object recognition using "visual localization" techniques, where the mobile platform includes a camera.

Figure 4:
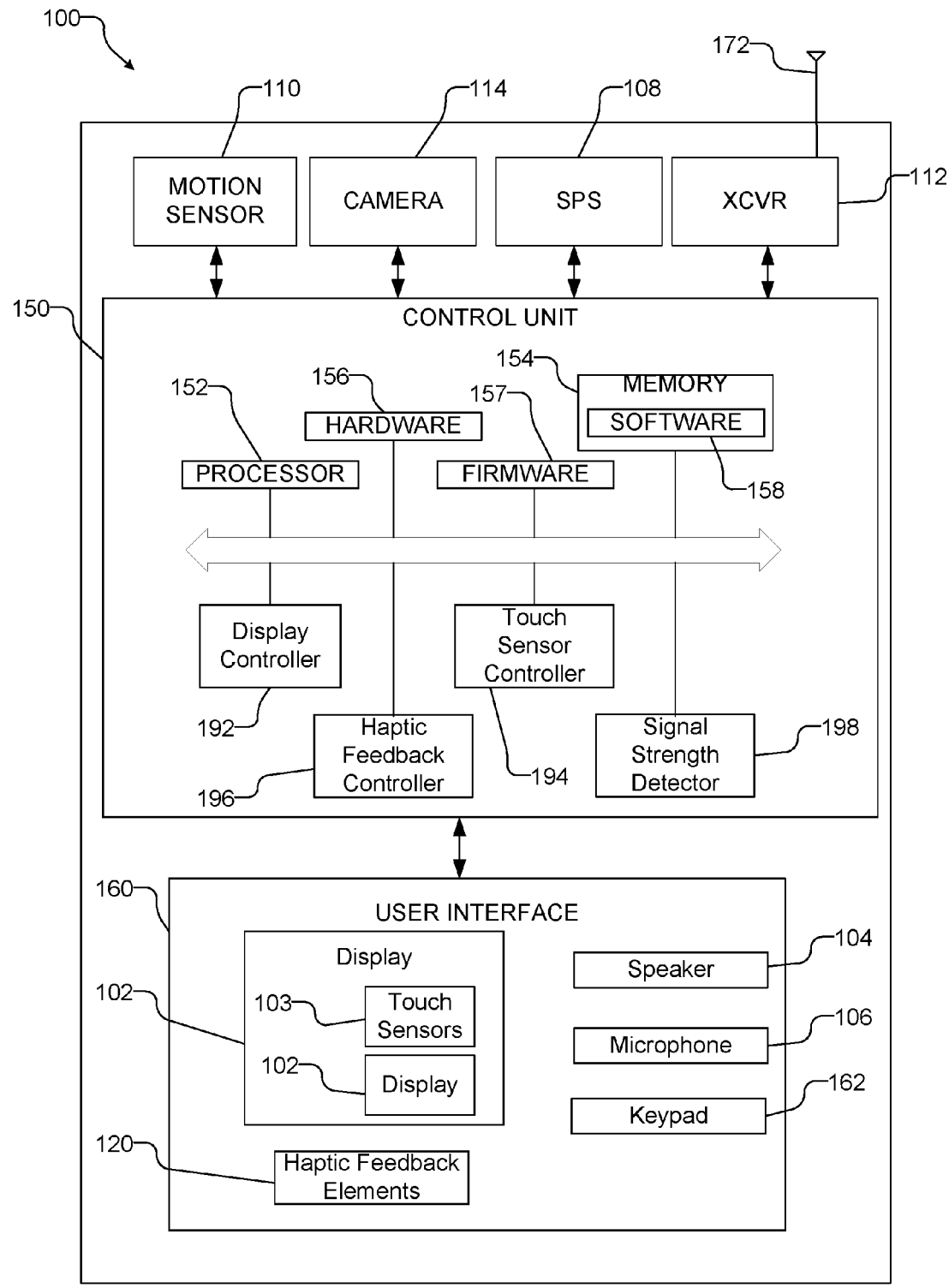
FIG. 4 is a block diagram of a mobile platform capable of providing haptic based navigation.

FIG. 4 is a block diagram of a mobile platform 100 capable of providing haptic based navigation. Mobile platform 100 includes a user interface 160 that is in communication with the control unit 150, e.g., the control unit 150 accepts data from and controls the user interface 160. The user interface 160 includes the display 102, which includes a means for displaying graphics, text, and images, such as an LCD or LPD display, and may include a means for detecting a touch of the display, such as the capacitive or resistive touch sensors 103. The user interface 160 further includes a means for providing haptic signals to a facial region of a user, such as haptic feedback elements 120. The user interface 160 may further include a keypad 162 or other input device through which the user can input information into the mobile platform 100. If desired, the keypad 162 may be obviated by integrating a virtual keypad into the touch screen display 102. The user interface 160 may also include, e.g., a speaker 104 and microphone 106. It should be understood that with some configurations of the mobile platform 100, portions of the user interface 160, e.g., the speaker 104, microphone 106 and haptic feedback elements 120 may be physically separated from the control unit 150 and connected to the control unit 150 via cables or wirelessly, for example, in a Bluetooth headset.

The mobile platform 100 may further include means for determining the present location of the mobile platform 100 such as an SPS receiver 108 and/or a wireless transceiver 112, e.g. a cellular modem or a wireless network radio receiver/transmitter that is capable of sending and receiving communications to and from a cellular tower or from a wireless access point, respectively, via antenna 172, and/or a motion sensor 110, such as three-axis accelerometers or gyroscopes. The motion sensor 110 may be used as part of the user interface 160 by detecting gestures in the form of movement of the mobile platform 100 or the orientation of the mobile platform 100 when gestures are detected by the touch screen display 102.

The mobile platform 100 may further include a means for receiving a desired location of the mobile platform 100, which may be, e.g., the user interface 160 through which the user may indicate a desired location. Additionally, the desired location may be determined based on a nearby location with superior signal strength compared to the strengths of the signals received by the transceiver 112 at the current location. Thus, the means for receiving a desired location may be based a signal strength detector 198, as well as a map of signal strengths, which may be stored in memory 154 of the control unit 150, or obtained from a server via transceiver 112. The means for receiving a desired location may also be the transceiver 112 through which a current location or intended future location of another mobile platform may be received.

The mobile platform 100 may further include a means for determining directions from the present location to the desired location, which may be, e.g., the control unit 150 if directions are calculated on board, or transceiver 112 when an external server provides the direction. The control unit 150 accepts and processes data from the user interface 160, SPS receiver 108, transceiver 112, and motion sensor 110 and controls the operation of the devices, including the haptic feedback elements 120, and thus, serves as a means producing haptic signals to a facial region of a user to provide the directions from present location to the desired location. The control unit 150 may be provided by a processor 152 and associated memory 154, hardware 156, software 158, and firmware 157. The control unit 150 includes a means for controlling the display 102, means for controlling the touch sensors 103 and means for controlling the haptic feedback elements 120, illustrated as a display controller 192, touch sensor controller 194, and haptic feedback controller 196, respectively. Additionally, the control unit 150 may include the signal strength detector 198 that detects the strength of the signals received by the transceiver 112. The display controller 192, touch sensor controller 194, haptic feedback controller 196, and signal strength detector 198 may be implanted in the processor 152, hardware 156, firmware 157, or software 158, i.e., computer readable media stored in memory 154 and executed by processor 152, or a combination thereof. The display controller 192, touch sensor controller 194, haptic feedback controller 196, and signal strength detector 198 nevertheless are illustrated separately for clarity.

It will be understood as used herein that the processor 152 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 156, firmware 157, software 158, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 154 and executed by the processor 152. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

For example, software 158 may include program codes stored in memory 154 and executed by the processor 152 and may be used to run the processor and to control the operation of the mobile platform 100 as described herein. A program code stored in a computer-readable medium, such as memory 154, may include program code program code to determine a present location of a mobile platform, to determine a desired location of the mobile platform, to determine directions from the present location to the desired location, to translate the directions into control signals; and to provide the control signals to activate at least one haptic feedback element while the at least one haptic feedback element is proximate to a facial region of a user to provide the directions from the present location to the desired location. The program code stored in a computer-readable medium may additionally include program code to cause the processor to control any operation of the mobile platform 100 as described further below.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 5:
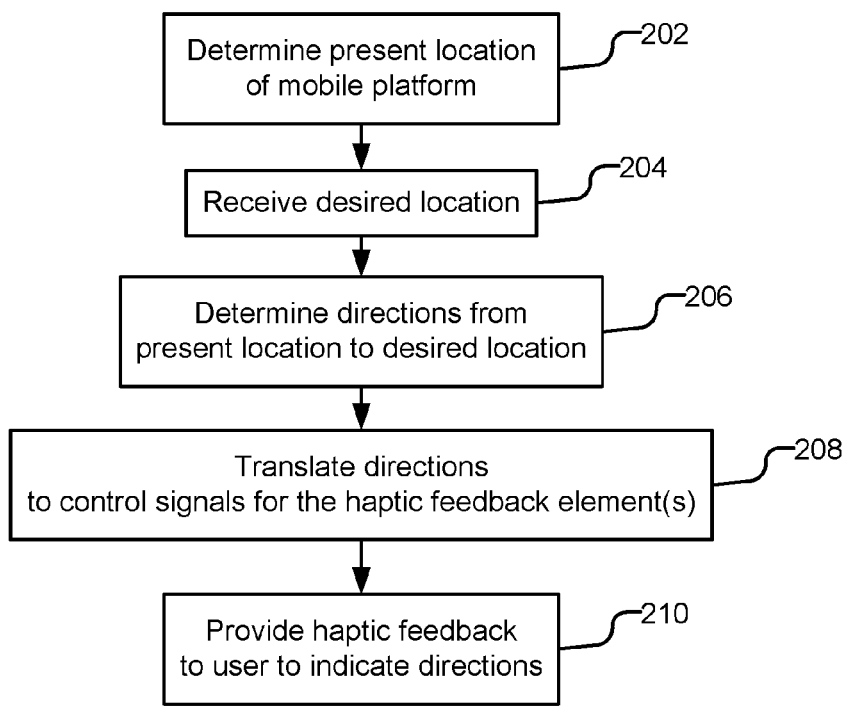
FIG. 5 illustrates a method of providing haptic based navigation in a mobile platform.

FIG. 5 illustrates a method of providing haptic based personal navigation in a mobile platform 100. As illustrated, the present location of the mobile platform is determined (202), e.g., based on SPS signals received by the SPS receiver 108. If desired, the present location of the mobile platform 100 may be determined using other techniques, such as dead reckoning or augmented dead reckoning, using motion sensors 110, wireless signal triangulation or fingerprinting using wireless transceiver 112, visual localization, using camera 114, or any other suitable manner.

The mobile platform 100 receives a desired location for the mobile platform 100 (204) to determine directions from the present location to the desired location (204). The destination may be provided by a user of the mobile platform 100, e.g., for example, the user may indicate the user's desired destination. The destination may alternatively be obtained automatically with an on board processor or an external server that the mobile platform 100 communicates with through the wireless transceiver 112. For example, the desired location may be a location with superior cellular signal strength relative to the current signal strength received by the mobile platform 100. The location of local signals with superior strength may be determined using a local signal strength map, which may be stored on the mobile platform 100 or accessed from an external server via transceiver 112. In one embodiment, the desired location having superior signal strength may be determined as a function of the current velocity of the mobile platform 100, which may be determined based on SPS data received by SPS receiver 108 or data from the motion sensor 110. Thus, for example, if a user is walking and the mobile platform 100 currently has poor signal strength, a nearby location with medium signal strength may be designated as the desired location, even if another, more distant location has excellent signal strength.

Figure 6:
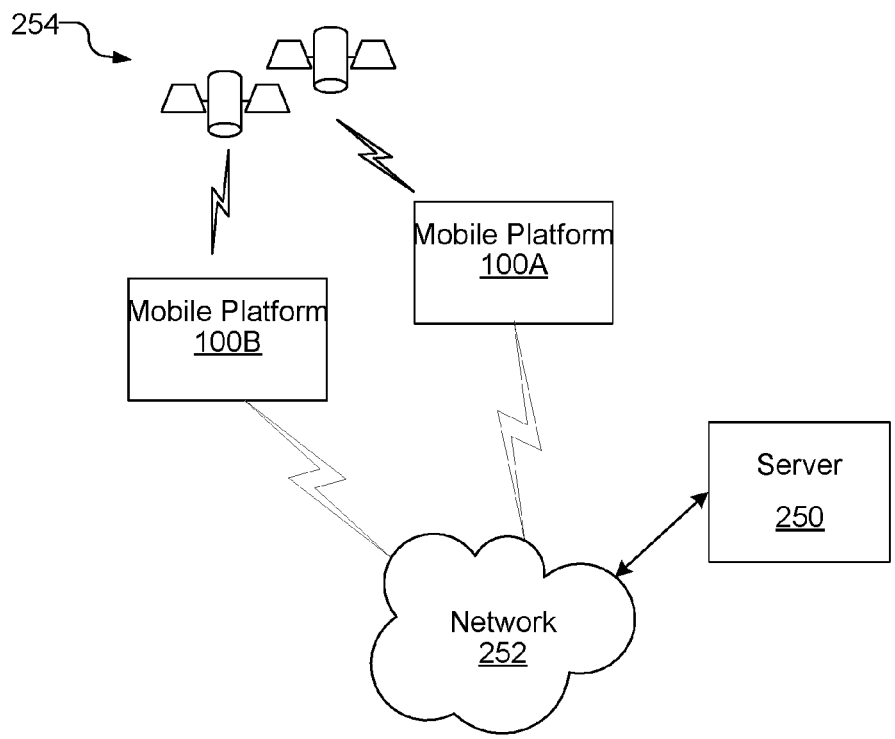
FIG. 6 illustrates two mobile platforms communicating with a server via a network.
Figure 9:
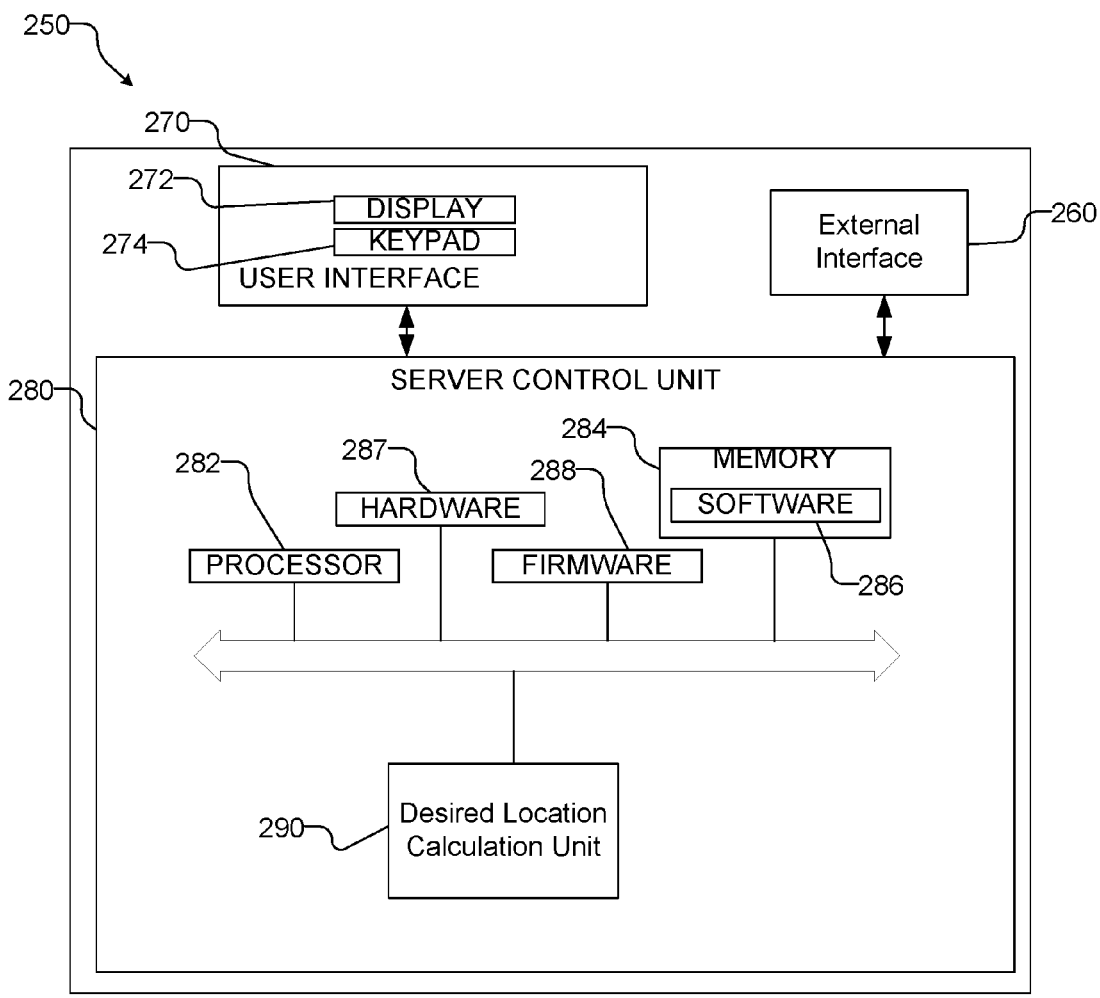
FIG. 9 is a block diagram of a server that is accessed by a plurality of mobile platforms to provide a desired location for the mobile platforms based on the present locations of the mobile platforms.
Figure 10A:
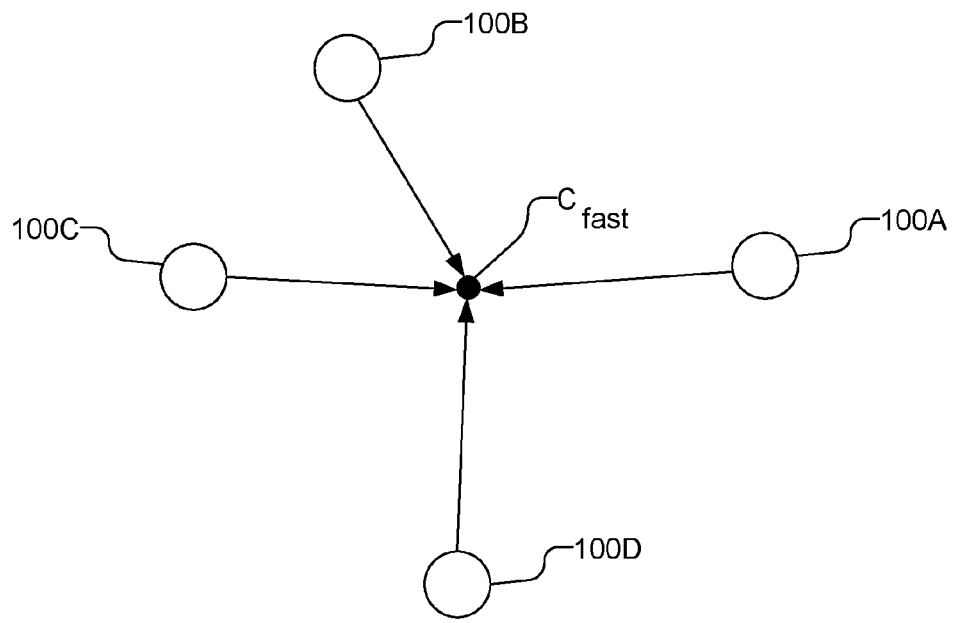
FIGS. 10A and 10B illustrate different manners of determining a central location between a plurality of mobile platforms.
Figure 10B:
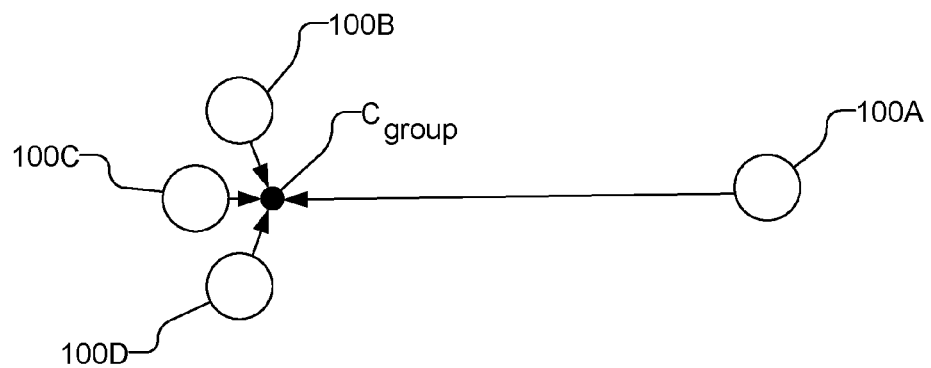

The desired destination may alternatively be the present or an intended future location of another mobile platform. For example, if a first user is talking to second user via their respective mobile platforms, it may be desirable to automatically guide the first user to the second user's current location or the second user's intended future location, as indicated by the second user or by a server that determines a central location for the two users. By way of example, where two or more mobile platform users wish to fine each other, they may run an application on their mobile platforms that connects them with a server. A login for identification and a password may be required for privacy concerns. FIG. 6, by way of example, illustrates two mobile platforms 100A and 100B communicating with a server 250 via network 252. Server 250 is illustrated in FIG. 9 below. Network 252 may be accessed via cellular towers, wireless access points, satellites or in any other desired manner. The network 252 is coupled to the server 250, which receives the present locations of the mobile platforms 100A and 100B, as determined via SPS system 254, and computes a central location between the two locations and provides the central location to both mobile platforms 100A and 100B as the desired location. The server 250 may also provide the directions to the central location or the mobile platforms 100A and 100B may determine the directions individually. The central location may be determined by the server 250 using possible routes or directions between the present locations of the mobile platforms, as opposed to simply using a geographic center, which may not be accessible to the mobile platforms. The central location may be a weighted centroid of the mobile platform locations. The server 250 may vary the weighting factor for different modes of operations, e.g., as selected by the users. For example, the server 250 may give each user an equal weight so that the individuals meet in the middle and find each other quickly. If three or more people are trying to find each other, the centroid for all the mobile platforms is used. FIG. 10A, by way of example, illustrates the present locations of four mobile platforms 100A, 100B, 100C, 100D, where a centroid Oast is determined by the server 250 to be approximately in the middle of the mobile platforms. In this configuration, the present locations are given equal weighting. To minimize walking for a group, however, the centroid may be computed by weighting using a weighted sum. For example, FIG. 10B illustrates the present locations of four mobile platforms 100A, 100B, 100C, and 100D, wherein mobile platforms 100B, 100C, and 100D are near each other and mobile platform 100A is distant. To minimize walking for the group, the centroid $C_{group}$ is weighted towards the group, and thus, mobile platform 100A will have to walk to the group, rather than have the group and the individual meet in the middle. The desired location may be periodically updated, e.g., by the mobile platforms 100A and 100B periodically providing their respective current locations and the server 250 responding by calculating and providing a new desired location based on the new respective current locations. Additionally, the server 250 may update the desired location for the mobile platforms 100A and 100B when a third mobile platform is connected to the server 250 and provides its current location.

The mobile platform 100 determines directions from the present location to the desired location (206), e.g., either using the on-board processor or by receiving the directions from external server that the mobile platform 100 communicates with through the wireless transceiver 112. Determining directions from one location to another is well known in the art. To provide accurate directions, the mobile platform 100 also determines if the user is traveling, and if so, the direction of that the user is traveling, and if the user is not moving, the direction that the user is facing. One way to determine if the user is traveling is to periodically sample the SPS positioning system 108. If the user's position is changing, a vector may be computed based on the position sampled at different times. The current location and direction of travel may then be used to determine the directions, e.g., the direction of travel is used as the basis for the first direction to be provided. If the user's position is not changing, i.e., the user is standing still, the orientation sensors 110 may be used to determine the direction that the user is looking, so that the current location and the direction that the user is looking are used to determine the directions, e.g., the orientation is used as the basis for the first direction to be provided. For example, if the user's torso is facing North, but the user's head is facing West, and the desired direction is South, the directions may indicate that the user is to continue to turn left until the user is looking South, and once looking South, the user should proceed straight. If the user is traveling, the direction of travel may be considered more important than the direction that the user is looking.

The directions are translated into control signals to be provided to the one or more haptic feedback elements (208), that are proximate to a facial region of a user while the user holds the mobile platform 100 to an ear, e.g., while using the mobile platform 100 as a cellular telephone. The haptic feedback elements are proximate, i.e., next to or close to, the facial region of the user so that the sensations can be felt by the user's facial region. For example, with vibration and thermal haptic feedback elements, the haptic feedback elements are in contact with the facial region of the user. On the other hand, with use of electric force elements, illustrated in FIG. 2, the haptic feedback elements are close to, but not touching, the facial region so that the electric field can be sensed by the user. In one embodiment, the mobile platform 100 may use a capacitive or resistive touch sensor 103 on the display 102 (shown in FIG. 2) to determine what regions 126 of the display 102 are in contact with the user's facial region. The mobile platform 100 may activate nearby haptic feedback elements that are not in contact with the user, but that are close enough to the user's facial region that the user will detect the haptic signal. Accordingly, activation of haptic feedback elements in regions that are in contact with the user can be avoided, which is advantageous as such contact may prevent the inducement of the haptic signal.

The directions may be translated into control signals for haptic feedback elements that are in separation regions of the mobile platform, e.g., 120A and 120B, illustrated in FIG. 1, to provide different directions, e.g., activation of haptic feedback element 120A indicates turn left, while activation of haptic feedback element 120B indicates turn right. If desired, the translation of the directions may be a function of the current orientation of the mobile platform 100 as determined by the motion sensors 110. Alternatively, or additionally, the directions may be translated into control signals for the haptic feedback elements 120 that differ in at least one of length, frequency, and pattern to provide different directions, e.g., a short signal indicates turn left while a long signal indicates turn right.

Figure 7:
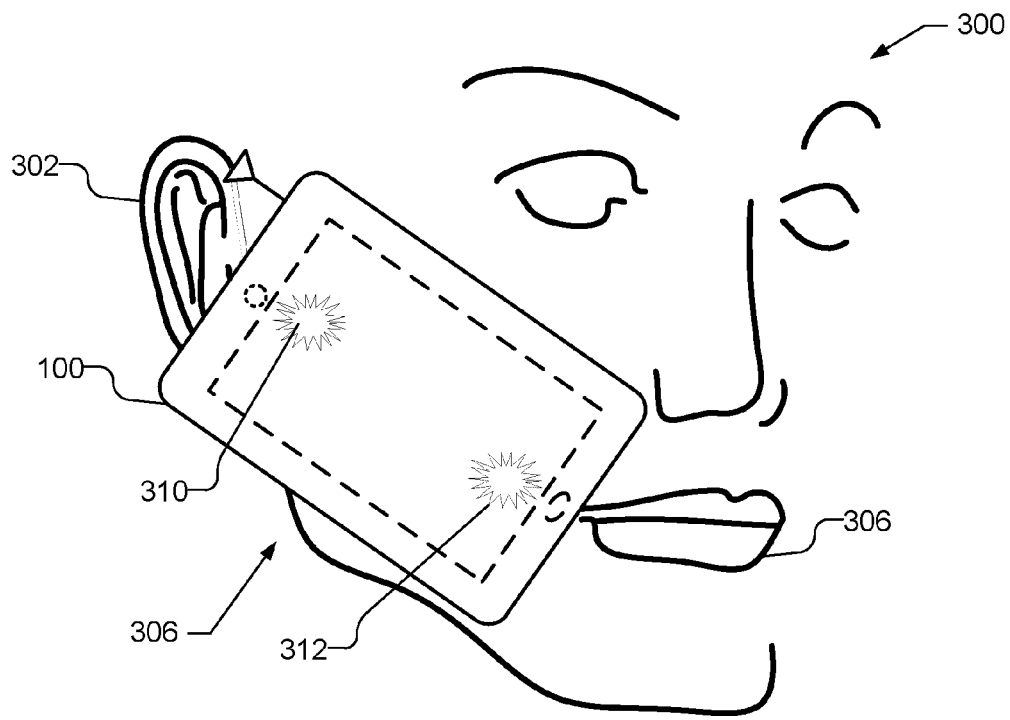
FIG. 7 illustrates a user holding a mobile platform to an ear while receiving haptic based navigation signals.

In response to the control signals, the one or more haptic feedback elements produces haptic signals to the facial region of the user (210) thereby providing directions from present location to the desired location. FIG. 7, by way of example, illustrates a user 300 holding the mobile platform 100 to an ear 302, e.g., while using the mobile platform 100 as a cellular telephone. While in this position, the haptic feedback elements in the mobile platform are proximate to the facial region 304 of the user 300. The haptic signal may be provided at different areas of the facial region 304 as indicated by the starbursts 310 and 312. A signal 310 applied at a region near the top of the mobile platform 100, e.g., on or near the user's ear 302, may be used to indicate that the user should turn left, while a force applied to the bottom of the mobile platform 100, e.g., near the user's mouth 306, may be used to indicate that the user should turn right. Additional signals may be provided by combinations or sequences of signals applied to the two illustrated regions and/or to additional regions. Moreover, if desired, instead of the haptic feedback elements providing a signal via an electric field, the haptic signal may be a vibration or thermal sensation produced at the indicated regions, or in a signal region, in a similar fashion. Moreover, different types of haptic signals may be used to provide different directions, for example, signals of different lengths or different sequences of signals may be used, e.g., a short vibration for turning right and a long vibration (or two vibrations) for turning left.

Figure 8:
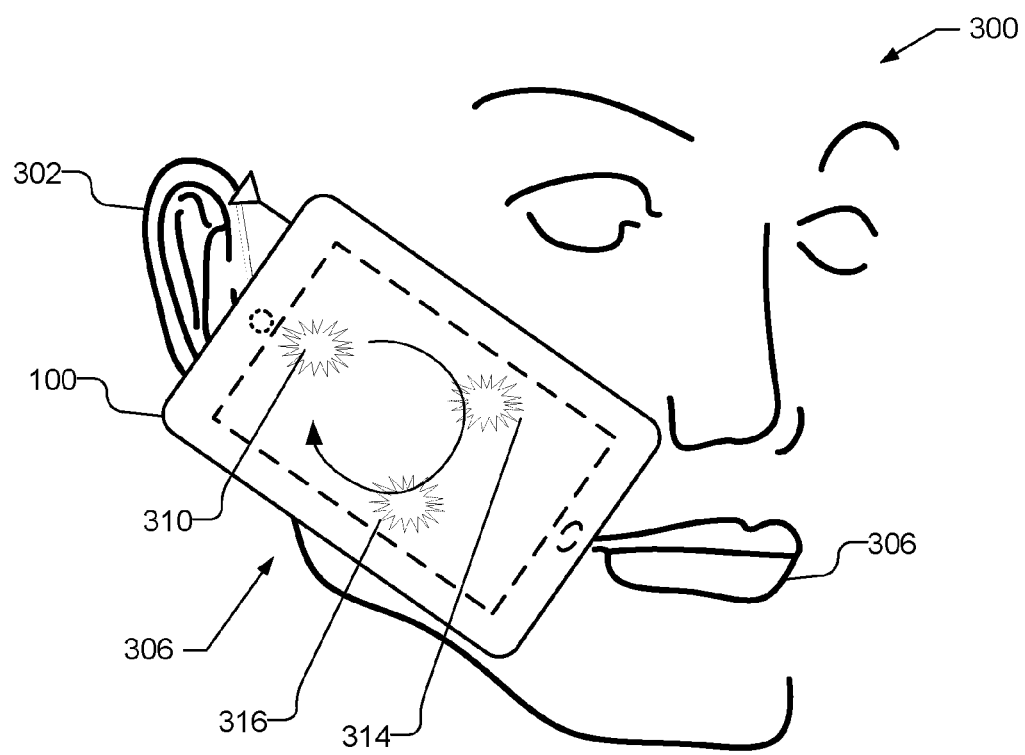
FIG. 8 also illustrates a user holding a mobile platform to an ear while receiving haptic based navigation signals.

Additionally, as illustrated in FIG. 8, haptic signals may be applied at additional regions of the mobile platform 100. FIG. 8 is similar to FIG. 7, but illustrates the use of haptic signals from three different regions of the mobile platform to provide directions to the use. With the use of more than two regions, haptic signals may be provided sequentially in a clockwise direction (as illustrated in FIG. 8) by sequentially producing haptic signals 310, 314, and 316, or in a counter-clockwise direction by sequentially producing haptic signals 310, 316, and 314, where clockwise may indicate in one direction and counterclockwise indicates turn in different direction. Again, if desired, the haptic signals from the different regions may be provided simultaneously and/or different types of signals may be provided, e.g., pulsing, from two or more regions to indicate arrival or near arrival at destination or to advise the user 300 to look at the display 102.

FIG. 9 is a block diagram of a server 250 that is accessed by a plurality of mobile platforms 100 to provide a desired location for the mobile platforms 100 based on the present locations of the mobile platforms. While FIG. 9 illustrates a single server 250, it should be understood that multiple servers communicating over external interface 260 may be used. The server 250 includes an external interface 260 coupled to the network 252 (shown in FIG. 6) for receiving the present locations from the mobile platforms 100, as well as any login and password information that may be used and for providing the desired location to the mobile platforms 100. The external interface 260 may be a wired communication interface or a wireless interface. The server 250 further includes a user interface 270 that includes, e.g., a display 272 and a keypad 274 or other input device through which the user can input information into the server 250.

The server 250 includes a server control unit 280 that is connected to and communicates with the external interface 260 and the user interface 270. The server control unit 280 accepts and processes data from the external interface 214, as well as the user interface 270 and controls the operation of those devices. The server control unit 280 may be provided by a processor 282 and associated memory 284, software 286, as well as hardware 287 and firmware 288 if desired. The server control unit 280 includes a desired location calculation unit 290, which calculates the central location between the present locations of the mobile platforms. The desired location calculation unit 290 may be implanted in the processor 282, hardware 287, firmware 288, or software 286, i.e., computer readable media stored in memory 284 and executed by processor 282, or a combination thereof. The desired location calculation unit 290 nevertheless is illustrated separately for clarity.

It will be understood as used herein that the processor 282 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in software 286, hardware 287, firmware 288 or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 284 and executed by the processor 282. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

For example, software 286 codes may be stored in memory 284 and executed by the processor 282 and may be used to run the processor and to control the operation of the server 250 as described herein. A program code stored in a computer-readable medium, such as memory 284, may include program code to determine a central location for a first present location of a first mobile platform and a second present location of a second mobile platform; and cause the external interface 260 to provide the central location to the first mobile platform and the second mobile platform.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   determining a present location of a mobile platform;
   receiving a desired location for the mobile platform;
   determining directions from the present location to the desired location;
   translating the directions into control signals provided to one or more haptic feedback elements positioned in one or more regions of the mobile platform that are proximate to a facial region of a user; and
   producing haptic signals to the facial region of the user by the one or more haptic feedback elements in response to the control signals to provide the directions from the present location to the desired location, wherein the haptic signals are produced by interaction of the facial region of the user with a localized electric field produced by the one or more haptic feedback elements on the mobile platform.

2. The method of claim 1, wherein translating the directions into the control signals provided to the one or more haptic feedback elements comprises producing the control signals to the one or more haptic feedback elements in separate regions to provide different directions.

3. The method of claim 1, wherein translating the directions into the control signals provided to the one or more haptic feedback elements comprises producing control signal that differ in at least one of length, frequency, and pattern to provide different directions.

4. The method of claim 1, wherein producing the haptic signals comprises producing a first haptic signal in a first region of the mobile platform to indicate turn a first direction and a second haptic signal in a second region of the mobile platform to indicate turn a second direction that is different than the first direction, the first region being different than the second region.

5. The method of claim 1, wherein producing the haptic signals comprises producing a first haptic signal in a first region of the mobile platform, a second haptic signal in a second region of the mobile platform, and a third haptic signal in a third region of the mobile platform, the first region, the second region and the third region being different.

6. The method of claim 5, wherein the first haptic signal, the second haptic signal, and the third haptic signal are provided sequentially in a clockwise order to indicate turn a first direction and a counter-clockwise order to indicate turn a second direction that is different than the first direction.

7. The method of claim 5, wherein the first haptic signal, the second haptic signal, and the third haptic signal are provided simultaneously with at least one of different lengths, frequency and pattern to provide the directions.

8. The method of claim 1, further comprising monitoring areas of a touch screen display that are in contact with the facial region of the user and wherein producing the haptic signals to the facial region of the user comprises producing the haptic signals by the one or more haptic feedback elements that are in regions adjacent to but not coincident with areas of the touch screen display that are in contact with the facial region of the user.

9. The method of claim 1, wherein the haptic signals further comprise at least one of vibration and thermal signals.

10. The method of claim 1, wherein the haptic signals are produced while the user is using the mobile platform as a cellular telephone.

11. The method of claim 1, wherein the desired location for the mobile platform comprises a location with a signal strength that is better than the signal strength of the present location.

12. The method of claim 11, wherein the desired location is a function of a current velocity of the mobile platform.

13. The method of claim 1, wherein the desired location for the mobile platform comprises a location of a second mobile platform.

14. The method of claim 13, wherein the location of the second mobile platform is one of a current location or a future location of the second mobile platform.

15. The method of claim 1, further comprising communicating with a server by providing the present location of the mobile platform and in response receiving the desired location based on the present location of the mobile platform and a present location of a second mobile platform.

16. The method of claim 15, further comprising receiving a new desired location from the server based on at least one of a change in the present location of the mobile platform or the second mobile platform and a present location of a third mobile platform.

17. The method of claim 1, wherein determining the directions from the present location to the desired location comprises:
  determining that the mobile platform is traveling;
  determining a direction of travel of the mobile platform; and
  using the direction of travel as a basis for a first direction from the present location to the desired location.

18. The method of claim 1, wherein determining the directions from the present location to the desired location comprises:
  determining that the mobile platform is not traveling;
  determining an orientation of the mobile platform; and
  using the orientation of the mobile platform as a basis for a first direction from the present location to the desired location.

19. A mobile platform comprising:
  at least one haptic feedback element positioned in one or more regions of the mobile platform that are proximate to a facial region of a user, wherein the at least one haptic feedback element comprises a plurality of electric force elements on the mobile platform;
  a wireless transceiver;
  a position determination receiver;
  a processor connected to the at least one haptic feedback element, the wireless transceiver, and the position determination receiver;
  memory connected to the processor; and
  software held in the memory and run in the processor to determine a present location of the mobile platform using data from the position determination receiver, to receive a desired location of the mobile platform, to determine directions from the present location to the desired location of the mobile platform, to translate the directions into control signals to be provided to the at least one haptic feedback element; and to activate the at least one haptic feedback element while the at least one haptic feedback element is proximate to the facial region of the user to provide the directions from the present location to the desired location to the user by interaction of the facial region of the user with a localized electric field produced by the plurality of electric force elements.

20. The mobile platform of claim 19, wherein there are a plurality of haptic feedback elements in separate regions of the mobile platform, wherein the software held in the memory and run in the processor causes the processor to translate the directions into the control signals for haptic feedback elements in separate regions to provide different directions.

21. The mobile platform of claim 19, wherein the software held in the memory and run in the processor causes the processor to translate the directions into the control signals that differ in at least one of length, frequency, and pattern to provide different directions.

22. The mobile platform of claim 19, wherein there are a plurality of haptic feedback elements in separate regions of the mobile platform, and the software held in the memory and run in the processor causes the processor to activate a first haptic feedback element in a first region of the mobile platform to indicate turn a first direction and to activate a second haptic feedback element in a second region of the mobile platform to indicate turn a second direction that is different than the first direction, the first region being different than the second region.

23. The mobile platform of claim 19, wherein there are a plurality of haptic feedback elements in separate regions of the mobile platform, and the software held in the memory and run in the processor causes the processor to activate a first haptic feedback element in a first region of the mobile platform, a second haptic feedback element in a second region of the mobile platform, and a third haptic feedback element in a third region of the mobile platform, the first region, the second region and the third region being different.

24. The mobile platform of claim 23, wherein the first haptic feedback element, the second haptic feedback element, and the third haptic feedback element are activated sequentially in a clockwise order to indicate turn a first direction and a counter-clockwise order to indicate turn a second direction that is different than the first direction.

25. The mobile platform of claim 23, wherein the first haptic feedback element, the second haptic feedback element, and the third haptic feedback element are activated simultaneously with at least one of different lengths, frequency and pattern to provide the directions.

26. The mobile platform of claim 19, further comprising a touch screen display coupled to the processor, the software held in the memory and run in the processor causes the processor to monitor areas of the touch screen display that are in contact with the facial region of the user, and to activate the at least one haptic feedback element by activating one or more haptic feedback elements that are in regions adjacent to but not coincident with the areas of the touch screen display that are in contact with the facial region of the user.

27. The mobile platform of claim 19, wherein the at least one haptic feedback elements further comprises at least one of a vibrating element and a thermal element.

28. The mobile platform of claim 19, further comprising a signal strength detector, wherein the desired location for the mobile platform comprises a location with a signal strength that is better than the signal strength of the present location.

29. The mobile platform of claim 28, wherein the software held in the memory and run in the processor causes the processor to determine a current velocity of the mobile platform and to determine the desired location as a function of the current velocity.

30. The mobile platform of claim 19, wherein the desired location for the mobile platform comprises a location of a second mobile platform as received by the wireless transceiver.

31. The mobile platform of claim 30, wherein the location of the second mobile platform is one of a current location or a future location of the second mobile platform.

32. The mobile platform of claim 19, wherein the software held in the memory and run in the processor causes the processor to cause the wireless transceiver to provide the present location to a server, and in response to receive the desired location based on the present location of the mobile platform and a present location of a second mobile platform.

33. The mobile platform of claim 32, wherein the wireless transceiver receives a new desired location from the server based on at least one of a change in the present location of the mobile platform or the second mobile platform and a present location of a third mobile platform.

34. The mobile platform of claim 19, wherein the software held in the memory and run in the processor causes the processor to determine that the mobile platform is traveling, determine a direction of travel of the mobile platform, and to use the direction of travel as a basis for a first direction from the present location to the desired location.

35. The mobile platform of claim 19, wherein the software held in the memory and run in the processor causes the processor to determine that the mobile platform is not traveling, determine an orientation of the mobile platform, and to use the orientation of the mobile platform as a basis for a first direction from the present location to the desired location.

36. A system comprising:
means for determining a present location of a mobile platform;
means for receiving a desired location for the mobile platform;
means for determining directions from the present location to the desired location; and
means for producing haptic signals to a facial region of a user to provide the directions from the present location to the desired location, wherein the haptic signals are produced by interaction of the facial region of the user with a localized electric field produced by one or more haptic feedback elements on the mobile platform.

37. A computer-readable medium including program code stored thereon, comprising:
program code to determine a present location of a mobile platform;
program code to determine a desired location of the mobile platform;
program code to determine directions from the present location to the desired location;
program code to translate the directions into control signals; and
program code to provide the control signals to activate at least one haptic feedback element while the at least one haptic feedback element is proximate to a facial region of a user to provide the directions from the present location to the desired location, wherein the haptic signals are produced by interaction of the facial region of the user with a localized electric field produced by the at least one or more haptic feedback elements on the mobile platform.

* * * * *